United States Patent [19]

Ono et al.

[11] 4,356,544
[45] Oct. 26, 1982

[54] APPARATUS FOR CONTROLLING AN INVERTER MAIN CIRCUIT

[75] Inventors: Takuo Ono, Yokohama; Sigeo Fukui, Nagoya; Junichi Ookura, Yokohama, all of Japan

[73] Assignee: Tokyo Shibaura Denki Kabushiki Kaisha, Kawasaki, Japan

[21] Appl. No.: 268,247

[22] Filed: May 29, 1981

[30] Foreign Application Priority Data

Jun. 5, 1980 [JP] Japan .......................... 55-78392[U]

[51] Int. Cl.³ .......................................... H02M 7/537
[52] U.S. Cl. ..................................... 363/132; 318/811
[58] Field of Search .............................. 31/801–803, 31/810–812; 363/37, 40–43, 98, 131, 132

[56] References Cited

U.S. PATENT DOCUMENTS 4,290,108  9/1981  Woehrle et al. ................ 318/810 X
4,312,031  1/1982  Kudor ............................. 318/811 X

OTHER PUBLICATIONS

Humblet et al., "A Realisation Example of a Microprocessor-Driven P.W.M. Transistor Inverter," 2nd International Conference on Electrical-Speed Drives, London, England, 25-27 Sep. 1979, pp. 151-156, S03650047.

Primary Examiner—A. D. Pellinen
Attorney, Agent, or Firm—Cushman, Darby & Cushman

[57] ABSTRACT

An apparatus for controlling an inverter main circuit has a memory circuit for storing digital control signals which correspond to 180°/n portions of output voltage waveforms of the inverter main circuit, where n is an integer. The memory circuit has a plurality of memory areas. One of the memory areas is designated by a digital signal supplied from a speed setting circuit. And the addresses of any memory area thus designated are designated by output signals of an up-down counter, one after another in ascending order of their serial numbers (forward direction) and in descending order of their serial numbers (backward direction). As they are designated, the memory regions corresponding to addresses supplies control signals. Every time the addressing direction is changed, the up-down counter generates a clock signal to a converter circuit which has 2n output terminals. In response to the clock signal supplied from the up-down counter, the converter circuit supplies signals to a waveform synthesizer circuit, one after another via the 2n output terminals. According to the signals from the converter circuit the waveform synthesizer circuit supplies to the inverter main circuit the control data in a predetermined order.

4 Claims, 12 Drawing Figures

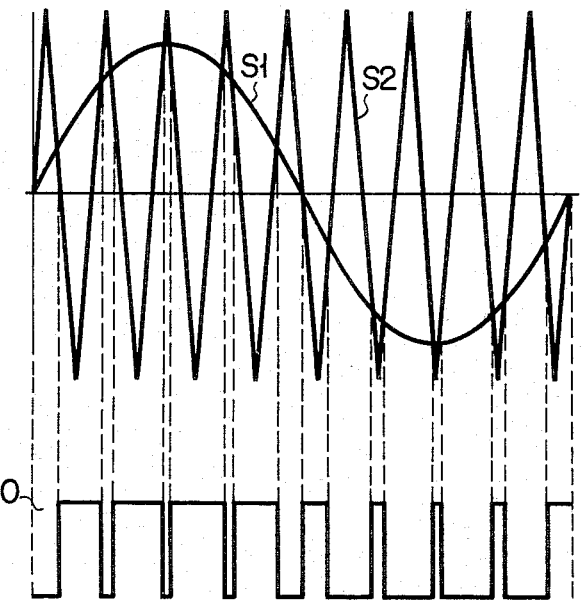
FIG. 3A
(PRIOR ART)
FIG. 3B
(PRIOR ART)
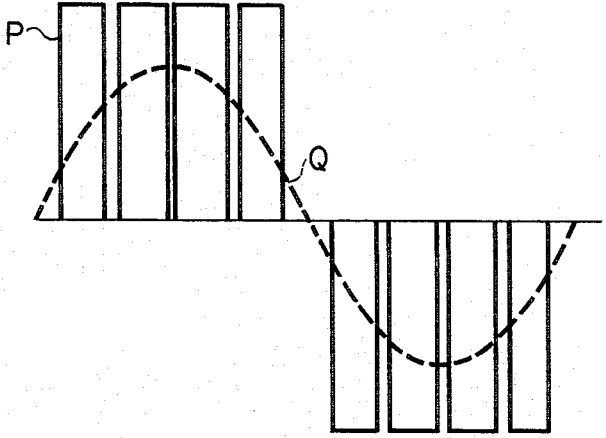
FIG. 3C
(PRIOR ART)

F I G. 5
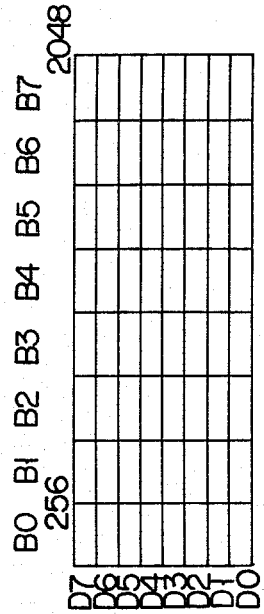
F I G. 6
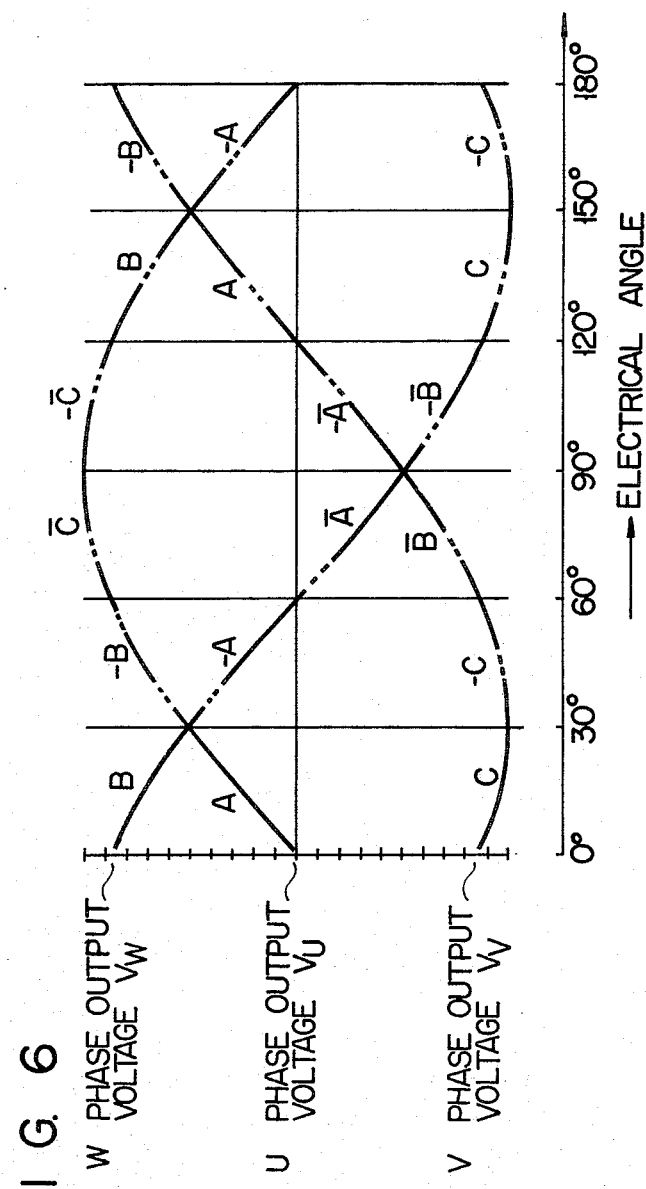

APPARATUS FOR CONTROLLING AN INVERTER MAIN CIRCUIT

BACKGROUND OF THE INVENTION

This invention relates to an apparatus for controlling the main circuit of an inverter, which effects pulse width modulation corresponding to a sinusoidal wave, thereby turning on and off the switching elements of the inverter main circuit so that the inverter may generate an AC output of a sinusoidal waveform and may thus effectively control the revolving speed of an AC motor.

It is desired that an inverter generate an output of a sinusoidal waveform if it is to control the revolving speed of an AC motor. Various measures have been take to make an inverter produce an output of a sinusoidal waveform. More specifically, various measures have been taken particularly in the control circuit of an inverter.

FIGS. 1 and 2 show an inverter commonly used to control the revolving speed of an AC motor, FIG. 1 illustrating the main circuit of the inverter and FIG. 2 the control circuit of the inverter.

As shown in FIG. 1, the main circuit 10 is constituted by a DC power source E and a three phase bridge circuit 12. The bridge circuit 12 consists of six transistors Tr1 to Tr6 which act as switching elements and three output terminals U, V and W. The collectors of transistors Tr1 to Tr3 are connected to the positive terminal of the power source E respectively and their emitters are connected to the negative terminal of the power source E through the transistors Tr4, Tr5 and Tr6. The output terminal U is connected to the point where the transistors Tr1 and Tr4 are connected. Likewise, the output terminal V is connected to the point where the transistors Tr2 and Tr5 are connected, and the output terminal W is connected to the point where the transistors Tr3 and Tr6 are connected. The bases B1 to B6 of the transistors Tr1 to Tr6 are connected to receive a control signal M0 supplied from the control circuit. When they receive the control signal M0, the transistors Tr1 to Tr6 are turned on. Thus, as the control signal M0 is supplied to them on and off, the transistors Tr1 to Tr6 switch the DC power source E, whereby an AC output is delivered from the output terminals U, V and W.

As shown in FIG. 2, the control circuit, which effects pulse width modulation (PWM) for generating a control signal M0, comprises a setting circuit 14, a voltage-frequency converter 16, a correcting circuit 18, an amplitude modulating circuit 20, a triangular wave generating circuit 22 and a comparing circuit 24. The setting circuit 14 generates a speed setting voltage $V_N$ which may be adjusted. The voltage-frequency converter 16 is connected to the setting circuit 14 and generates an output signal of a frequency which is proportional to voltage $V_N$ and which determines the output frequency f of the inverter main circuit 10. The correcting circuit 18 is connected to the setting circuit 14. It controls, according to voltage $V_N$, the output voltage V0 of the main circuit 10 in such a way that voltage V0 may have a specific relation with frequency f determined by the output signal of the converter 16. The amplitude modulating circuit 20 is connected to the converter 16 and the correcting circuit 18. It modulates the amplitude of a three phase sinusoidal wave according to the output signals of the converter 16 and the correcting circuit 18, thereby generating a signal S1 having such a sinusoidal waveform as illustrated in FIG. 3A. The triangular wave generating circuit 22 generates a signal S2 having such a triangular waveform as shown in FIG. 3A. The comparing circuit 24 is connected to the triangular wave generating circuit 22 and the amplitude modulating circuit 20. It compares signals S1 and S2, thus generating a control signal M0, which is such a pulse train as illustrated in FIG. 3B. The control signal M0 is supplied directly to the bases B1, B2 and B3 of the transistors Tr1 to Tr3. Further, it is inverted by an inverter 26 and then is supplied to the bases B4, B5 and B6 of the transistors Tr4 to Tr6. As a result, such a pulsative output signal P as shown in FIG. 3C is generated between the output terminal U and an imaginary neutral point of the DC power source E. This output signal P is, as a whole, similar to such a sinusoidal wave Q as illustrated also in FIG. 3C.

However, the waveform of the output signal P is unstable because the signals S1 and S2 are asynchronous. What is more, there arise some problems because the control circuit of FIG. 2 uses both analog circuits and digital circuits. First, to make the analog circuits perform their functions, off-set adjustment should be achieved and measures should be taken against drift. Secondly, the control circuit has to be made in the form of a hybrid IC, not a monolithic LSI, though it should better be made into a one-chip LSI if it is connected to a micro computer or the like when used. To solve the second problem, the control circuit may be so designed as to achieve pulse width modulation, that is, to generate control signals in accordance with digital data stored in a read only memory (ROM) or read only memories (ROMs). If the control circuit is so designed, however, various control data must be stored if the inverter is to drive an AC motor at different speeds. To store various control data, the control circuit should be provided with a number of ROMs or a single ROM of a large memory capacity and should inevitably become expensive.

SUMMARY OF THE INVENTION

It is an object of this invention to provide an apparatus for controlling an inverter main circuit, which can be made in the form of a one-chip LSI, which needs to be provided with but a memory of a small memory capacity for storing data necessary to generate various control signals, and which does not render unstable the output voltage waveform of the inverter main circuit.

This object has been attained by a control apparatus which comprises an output setting circuit for generating digital signals determining the output frequency of an inverter main circuit; a memory circuit connected to the output setting circuit for storing control signals having logic patterns corresponding to the frequencies represented by the digital signals, said control signals each corresponding to a 180°/n portion of the output voltage waveform of the inverter main circuit, where n is a positive integer; a correcting circuit connected to the output setting circuit for generating, according to the digital signals, a first clock signal which makes the output voltage of the inverter main circuit have a predetermined relation with the frequency represented by the digital signals; an up-down counter connected to the correcting circuit for counting up and down the first clock signals and reading the control signals from the memory circuit in ascending and descending sequences of address numbers of the memory circuit, thereby generating a second clock signal every time the counting direction is reversed; a converter connected to the up-down counter for generating a signal in response to the second clock signal, said converter having 2n output terminals from which one signal after another is supplied; and a waveform synthesizer circuit connected to the memory circuit and the converter for supplying to the inverter main circuit some of the control signals read from the memory circuit in a predetermined order, every time the inverter main circuit generates a 180°/n portion of the output voltage waveform and in accordance with the signals supplied one after another from the output terminals of the converter.

The control signals which the up-down counter reads from the memory circuit are synthesized to form a full wave of the output control signal of the inverter main circuit according to the output signals of the converter. Since the output signals of the converter are synchronous with the output signals of the up-down counter, the output voltage waveform of the inverter main circuit will not be distorted.

Further, since the control signals for turning on and off the switching elements (i.e. transistors) of the inverter main circuit have logic patterns, they can stored in the form of digital signals. For this reason the control apparatus may be formed in the form of a one-chip LSI. If so formed, the control circuit can be well interfaced to a micro computer or the like.

Still further, it is sufficient to store in the memory circuit control signals each of which corresponds to only the 180°/n portion of an output voltage waveform of the inverter main circuit. The memory capacity of the memory circuit can therefore be much smaller than that of a memory circuit which is required in the known control circuit as shown in FIG. 2. Hence, it suffices to use a memory of a small capacity or less memories. In consequence, the control apparatus is relatively inexpensive.

BRIEF DESCRIPTION OF THE DRAWINGS

The object of the invention will be seen by reference to the description, taken in connection with the accompanying drawings, in which:

FIGS. 3A to 3C show waveforms of signals, illustrating how the control circuit of FIG. 2 generates a control signal;

FIG. 5 is a memory map showing how data are written into a ROM 32 shown in FIG. 4;

FIG. 6 illustrates half-cycle waveforms of output voltages $V_U$, $V_V$ and $V_W$ which are obtained at output terminals U, V and W of the inverter main circuit shown in FIG. 1 when the inverter main circuit is controlled by the control apparatus of FIG. 4;

DETAILED DESCRIPTION OF THE PREFERRED EMBODIMENT

Figure 1:
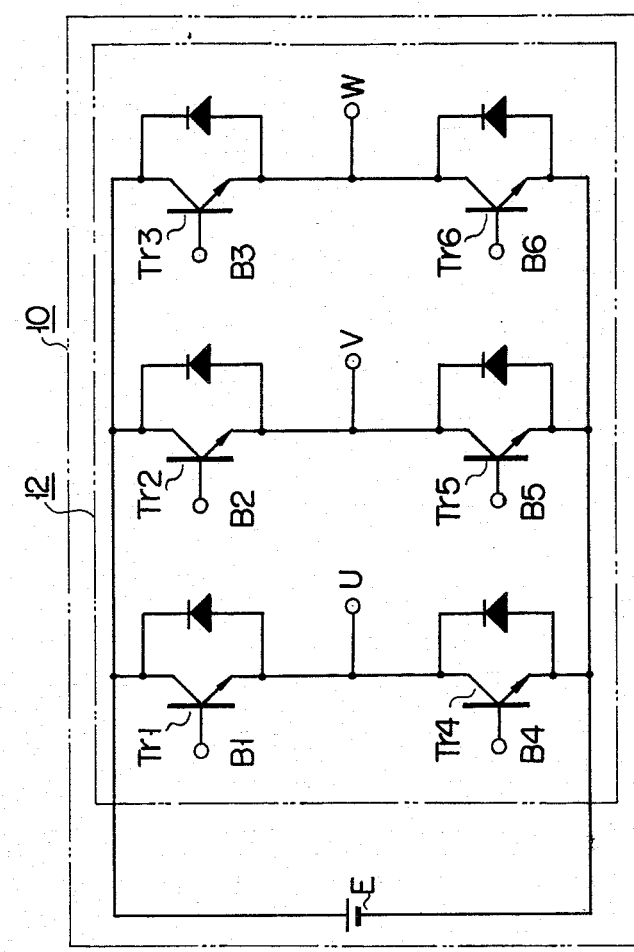
FIG. 1 shows the main circuit of an inverter commonly used.
Figure 2:
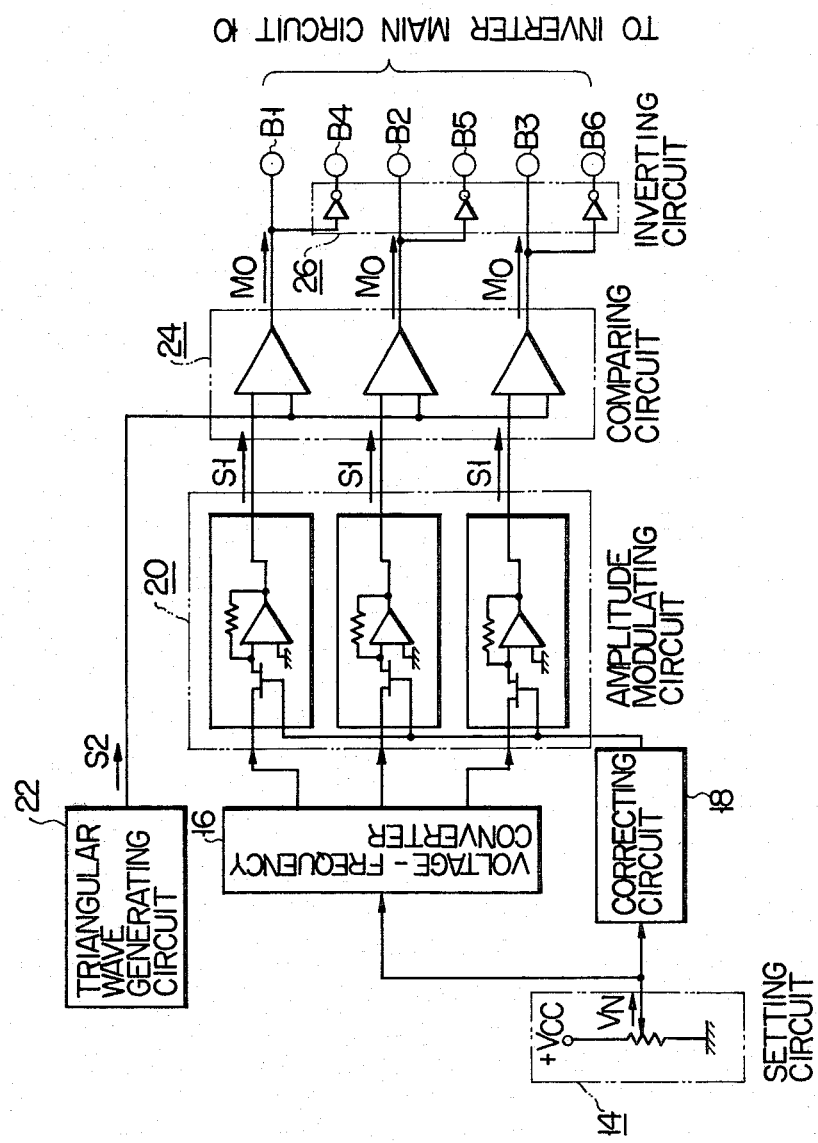
FIG. 2 is a block diagram of a known control circuit for controlling the inverter main circuit shown in FIG. 1.
Figure 4:
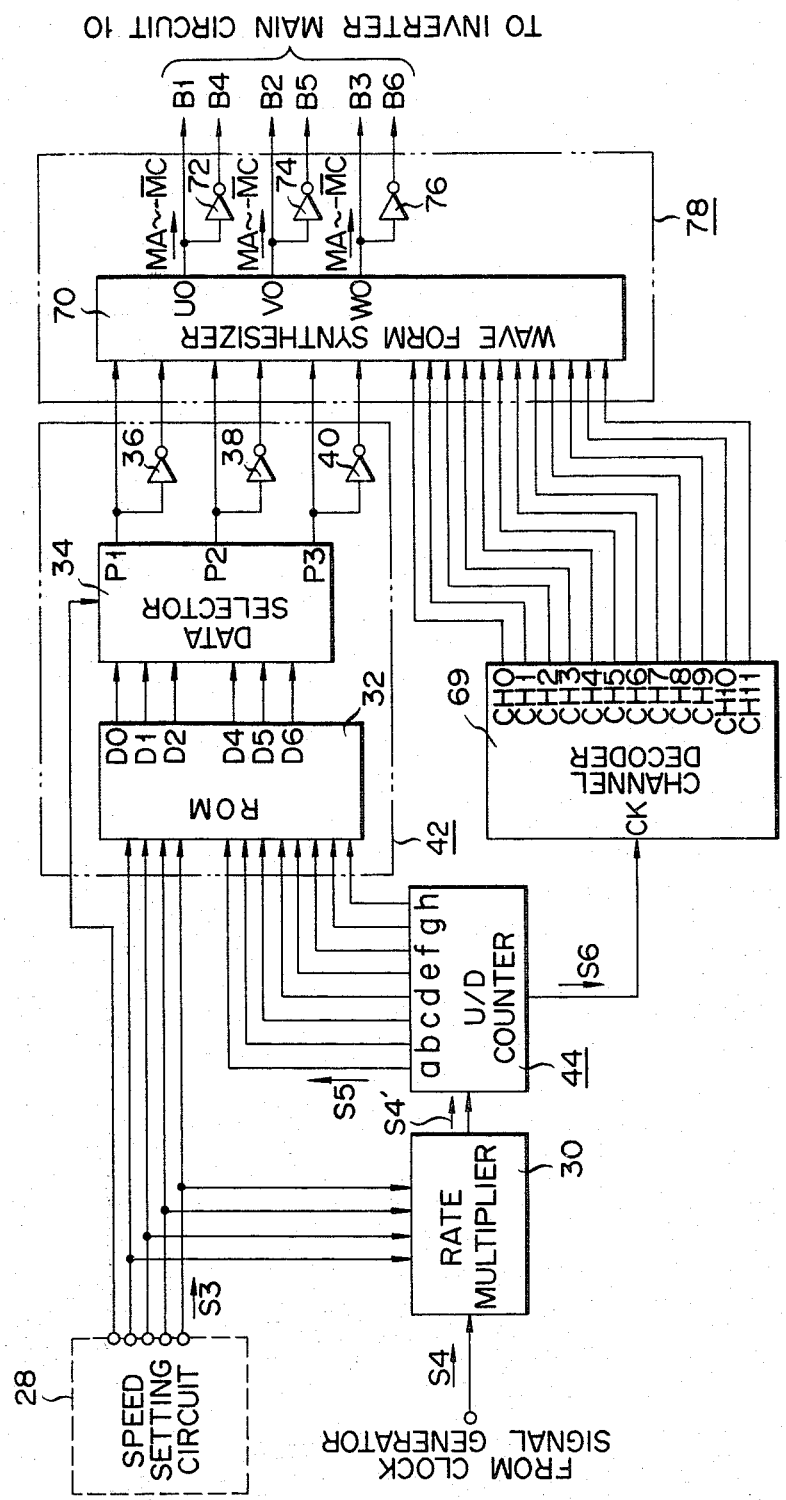
FIG. 4 is a block diagram of a control apparatus according to this invention.

FIG. 4 is a block diagram of an apparatus according to this invention, which is so designed as to control such an inverter main circuit 10 as shown in FIG. 1.

As shown in FIG. 4, the control apparatus comprises a speed setting circuit 28 and a rate multiplier 30. The speed setting circuit 28 is provided with, for example, a micro computer. It generates binary signals S3 and a data selection signal. The binary signals S3 are to determine the output frequency f of the inverter main circuit 10. The rate multiplier 30 is connected to the speed setting circuit 28 and receives the binary signals S3. According to the signals S3 the rate multiplier 30 divides the frequency of a clock signal S4 supplied from a clock signal generator (not shown), thus generating a clock signal S4'. The clock signal S4' serves to define a specific ratio between the output frequency f and each of the output voltages $V_U$, $V_V$ and $V_W$ of the inverter main circuit 10.

As shown in FIG. 4, the control apparatus further comprises a ROM 32 which is connected to the speed setting circuit 28. Stored in the ROM 32 are control signals which have specific logic patterns.

As understood from a memory map shown in FIG. 5, the ROM 32 has eight memory areas B0 to B7, each consisting of eight memory regions which correspond to bits D0 to D7, respectively. Each memory region stores 256 words, each consisting of eight bits. The ROM 32 therefore has a memory capacity of 131,072 bits ($=8\times256\times8\times8$).

The first words of the eight memory regions of memory area B0 are read out via bits D0 to D7 when 0th address of the memory area B0 is designated. Likewise, the second words of the eight memory regions are read out via bits D0 to D7 when the first address of the memory area B0 is designated, and the third words of the eight memory regions are read out via bits D0 to D7 when the second address of the memory area B0 is designated, and so forth. Thus, the last words, i.e. the 256th words of the eight memory regions are read out when the 255th address of the memory area B0 is designated. In similar manner, the words are read out of the other memory areas B1 to B7. FIG. 6 shows the half-cycle or 180°-waveforms of output voltages $V_U$, $V_V$ and $V_W$ to be obtained at the output terminals U, V and W of the inverter main circuit 10.

Figure 7:
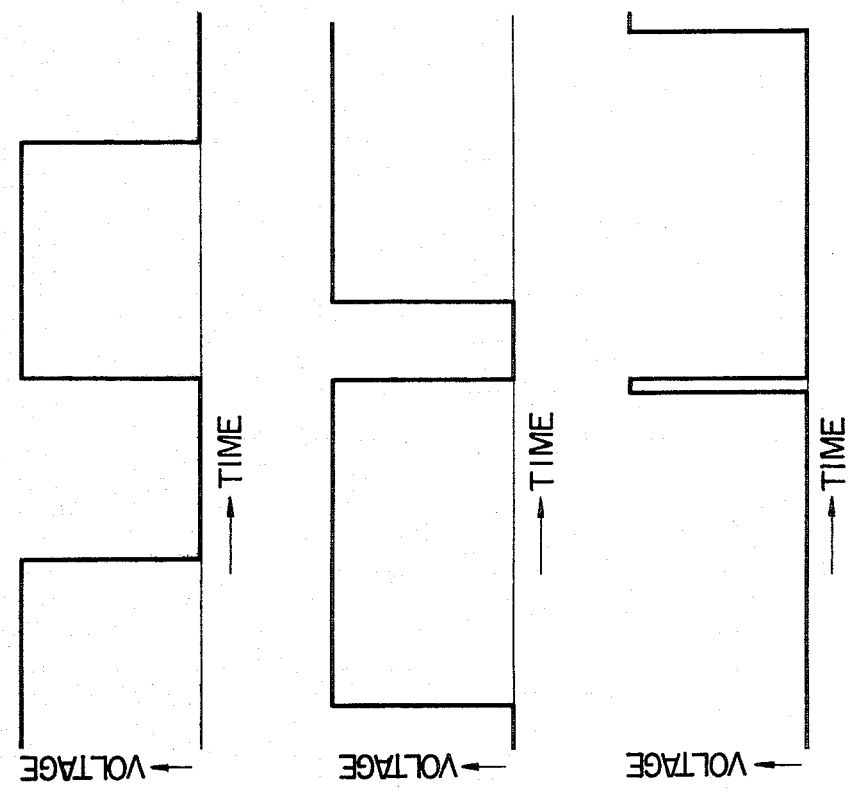
FIGS. 7A to 7C show the waveforms of control signals $M_A$, $M_B$ and $M_C$ stored in the ROM 32.

Three memory regions of the memory area B0, which correspond to bits D0, D1 and D2, store three control signals corresponding to 30°-portions ((180°/n)—portions, where n is 6) A, B and C of such voltage waveforms $V_U$, $V_V$ and $V_W$ of one frequency as shown in FIG. 6. Further other three memory regions of the memory area B0, which correspond to bits D4, D5 and D6, store three control signals corresponding to 30°-portions of three voltage waveforms of another frequency. More specifically, what is stored in each 8-bit word is a data representing an on-off signal, which has been obtained by chopping up the 30°-portions of three output voltage waveforms and quantizing the amplitudes of any 30°/256-portions of the waveforms. Thus, each address of the memory area B0 stores three data representing on-off signals for obtaining three output voltage waveforms of one frequency in three words corresponding to bits D0, D1 and D2 and other three data for on-off signals for obtaining three output voltage waveforms of another frequency in three words corresponding to bits D4, D5 and D6. In similar manner, each address of the other memory areas B1~D7 stores data representing on-off signals. Thus, the ROM 32 can store control signals corresponding to 16 different setting speed. For example, when data stored in each address of the memory area B0 is converted into control signals, on-off control signals $M_A$, $M_B$ and $M_C$ as shown in FIGS. 7A~7C are obtained at bits D0~D2 and bits D4~D6.

The control apparatus further comprises a data selector 34 and three inverter circuits 36, 38 and 40. The data selector 34 is connected to the speed setting circuit 28 and the ROM 32. According to the data selection signal supplied from the speed setting circuit 28, the data selector 34 reads three control signals from the ROM 32, for example the control signals $M_A$, $M_B$ and $M_C$ from the bits D0, D1 and D2 of the first memory area B0. The three control signals are then supplied through the output terminals P1, P2 and P3 of the data selector 34. The inverter circuits 36, 38 and 40 are connected respectively to the output terminals P1, P2 and P3. They receive and invert the three control signals.

The ROM 32, the data selector 34 and the inverter circuits 36, 38 and 40 constitute a memory circuit 42.

The control apparatus is provided with an up-down counter 44 (hereinafter called "U/D counter"), which is connected to the rate multiplier 30. It receives and counts the clock signals S4' supplied from the rate multiplier 30. It generates an output signal S5 representing its count. The signal S5 is supplied to the ROM 32, thereby specifying one of the memory areas B0 to B7 of the ROM 32.

Figure 8:
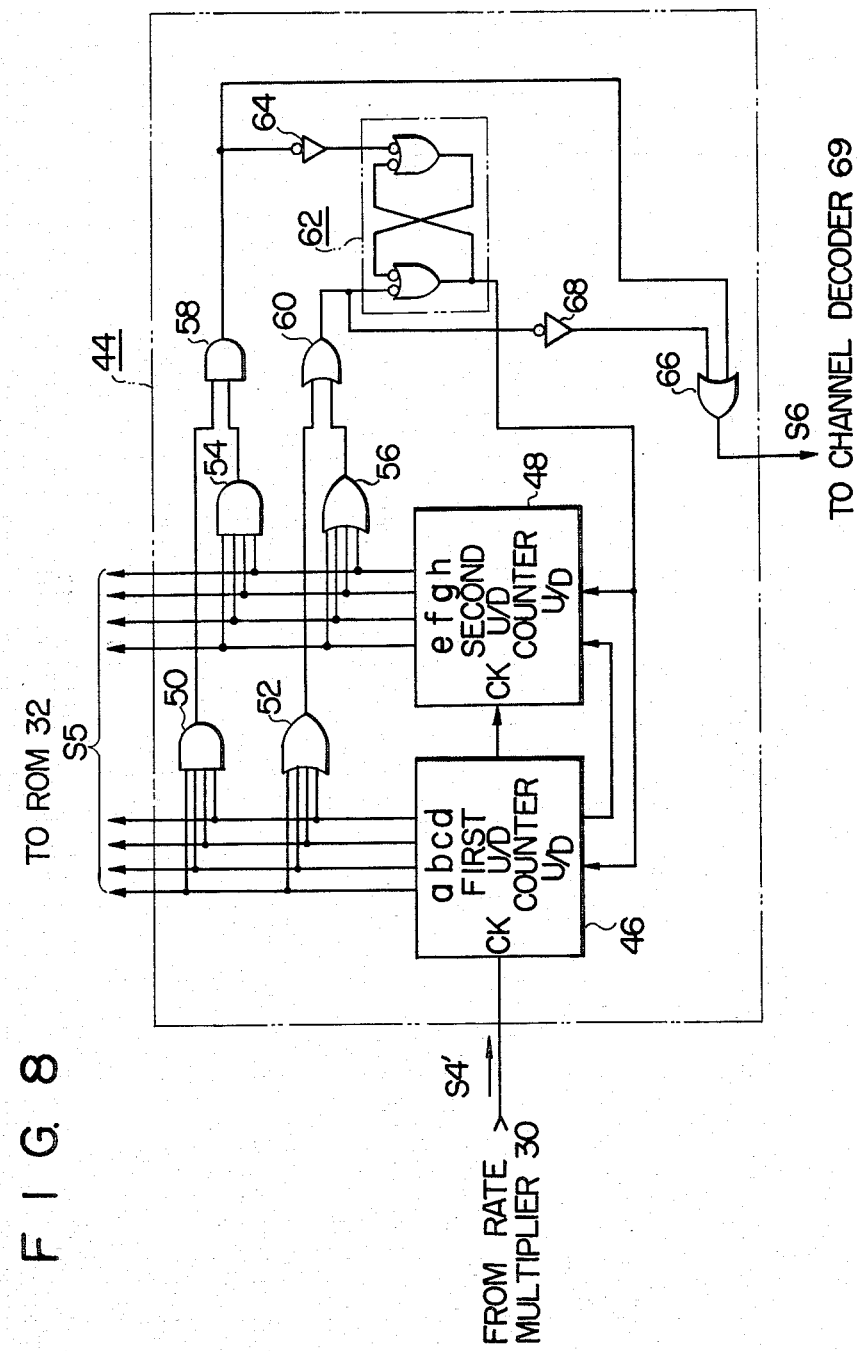
FIG. 8 is a circuit diagram of a U/D counter 42 shown in FIG. 4.

As shown in FIG. 8, the U/D counter 44 comprises two U/D counters 46 and 48. The first U/D counter 46 is connected to the rate multiplier 30 and counts the clock signals S4' supplied from the rate multiplier 30. The second U/D counter 48 is connected to the first U/D counter 46 and counts the output clock signals of the first U/D counter 46. The outputs of both U/D counters 46 and 48 are supplied as a signal S5 to the ROM 32. The first U/D counter 46 has its output coupled to an AND circuit 50 and an OR circuit 52. Likewise, the second U/D counter 48 has its output coupled to an AND circuit 54 and an OR circuit 56. The output terminals of the AND circuits 50 and 54 are connected the input terminals of an AND circuit 58. The output terminals of the OR circuits 52 and 56 are connected to the input terminals of an OR circuit 60.

The U/D counter 44 further comprises a flip-flop 62, an inverter circuit 64, an OR circuit 66 and an inverter circuit 68. The flip-flop 62 has one input terminal connected to the output terminal of the AND circuit 58 through the inverter circuit 64 and the other input terminal connected to the output terminal of the OR circuit 60. It has its output terminal connected to both U/D counters 46 and 48 and supplies a counting-up signal to the U/D counters 46 and 48. When the U/D counters 46 and 48 reach counts "1111" and "1111," respectively, the flip-flop 62 is reset, thus supplying a count-down signal to both U/D counters 46 and 48. Upon receipt of the count-down signal the U/D counters 46 and 48 starts operating as down-counters. When the U/D counters 46 and 48 reach counts "0000" and "0000," respectively, the flip-flop 62 is set, thus supplying a count-up signal to both U/D counters 46 and 48. Upon rceipt of the count-up signal the U/D counters 46 and 48 start working as up-counters. Thereafter, a count-down signal and a count-up signal are alternately generated, and the U/D counters 46 and 48 functions as down counters, then as up counters, and so on. As a result, the addresses of each of the memory areas B0 to B7 are designated first in forward direction, i.e. ascending order of their serial numbers, and then in backward direction, i.e. descending order of their serial numbers. As the addresses of each area are designated in either direction, data are read from them.

The OR circuit 66 has one input terminal connected to the output terminal of the AND circuit 58 and the other input terminal connected to the output terminal of the OR circuit 60 via the inverter circuit 68. The OR circuit 66 generates a clock signal S6 every time the flip-flop 62 is set or reset. That is, one clock signal S6 is generated every time three control signals, e.g. signals $M_A$, $M_B$ and $M_C$ are read from the ROM 32. In other words, it is generated every time the phases of the output voltages $V_U$, $V_V$ and $V_W$ of the inverter main circuit 10 advance by electrical angle of 30°.

As shown in FIG. 4, the control apparatus further comprises a channel decoder 69, which is connected to the U/D counter 44 to receive clock signals S6. The channel decoder 69 has 2n output terminals. In this embodiment, n=6. The channel decoder 69 therefore has 12 output terminals CH0 to CH11. As it receives clock signals S6, it supplies logic "1" signal, the first signal through the output terminal CH0, the second signal through the output terminal CH1, the third signal through the output terminal CH2, and so forth. The channel decoder 69 supplies 12 logic "1" signals in this manner every time the phases of the output voltages $V_U$, $V_V$ and $V_W$ of the inverter main circuit 10 advance one cycle, i.e. by electrical angle of 360°.

The control apparatus is further provided with a waveform synthesizer 70, which is connected to both the memory circuit 42 and the channel decoder 69. Thus the waveform synthesizer 70 receives control signals from the memory circuit 42 and logic "1" signals from the output terminals CH0 to CH11 of the channel decoder 69. Every time the phases of the output voltages $V_U$, $V_V$ and $V_W$ advance by electrical angle of 30°, the waveform synthesizer 70 selects three of the control signals according to the logic "1" signals and supplies the three control signals through its output terminals U0, V0 and W0, respectively. The output terminals U0, V0 and W0 are connected respectively to the bases B1, B2 and B3 of the transistors Tr1, Tr2 and Tr3 of the inverter main circuit 10. Further, the terminals U0, V0 and W0 are connected respectively to the bases B1, B2 and B3 of the transistors Tr4, Tr5 and Tr6 through inverter circuits 72, 74 and 76.

The waveform synthesizer 70 and the inverter circuits 72, 74 and 76 constitute a waveform synthesizing circuit 78.

All the elements of the control apparatus shown in FIG. 4, except for the speed setting circuit 28, can be formed on one semiconductor chip.

The control apparatus of FIG. 4 operates in the following manner.

First, it is assumed that binary signals S3 designating, for example, the first memory area B0 of the ROM 32 is supplied from the speed setting circuit 28 to the ROM 32 and the rate multiplier 30. It is also assumed here that data corresponding to control signals $M_A$, $M_B$ and $M_C$ shown in FIGS. 7A, 7B and 7C are stored in the memory regions corresponding to bits D0, D1 and D2 of the first memory area B0 of the ROM 32 and that a data selecting signal for selecting the data stored in bits D0, D1 and D2 is supplied from the speed setting circuit 28 to the data selector 34.

Then, according to the binary signals S3 the rate multiplier 30 divides the frequency of the clock signal S4, thus producing a clock signal S4'. The clock signal S4' is then supplied to the U/D counter 44. The U/D counter 44 counts the clock signal S4' and supplies a clock signal S6 to the ROM 32.

The first memory area B0 of the ROM 32 is already designated by the binary signals S3. Thus, as clock signals S6 are supplied to the ROM 32, the addresses of the first area B0 are repeatedly designated one after another, alternately in forward direction and backward direction. In the meantime, a clock signal S6 is supplied to the channel decoder 69 every time the direction of designating the addresses of the first area B0 is reversed.

As the addresses of the first area B0 are designated one after another, data are read from the bits D0 to D7 of each address. The data thus read are supplied to the data selector 34. Supplied with the data selecting signal for selecting the data stored in the regions for bits D0, D1 and D2, the data selector 34 selects the data read from the bits D0, D1 and D2 and supplies them through the output terminals P1, P2 and P3. When the addresses of the first area B0 are designated in forward direction, control signals $M_A$, $M_B$ and $M_C$ corresponding to 30°-portions A, B and C of voltage waveforms $V_U$, $V_V$ and $V_W$ are supplied through the output terminals P1, P2 and P3 of the data selector 34. In this case, signals $\overline{M}_A$, $\overline{M}_B$ and $\overline{M}_C$ are supplied from the inverter circuits 36, 38 and 40, respectively. The control signals $\overline{M}_A$, $\overline{M}_B$ and $\overline{M}_C$ correspond to 30°-portions, $\overline{A}$, $\overline{B}$ and $\overline{C}$ of voltage waveforms $V_U$, $V_V$ and $V_W$ shown in FIG. 6. Then, the addresses of the first area B0 are designated in backward direction, and control signals $-M_A$, $-M_B$ and $-M_C$ which correspond to 30°-portions $-A$, $-B$ and $-C$ (indicated in chain line) of the voltage waveforms $V_U$, $V_V$ and $V_W$ are supplied through the output terminals P1, P2 and P3 of the data selector 34. In this case, control signals $-\overline{M}_A$, $-\overline{M}_B$ and $-\overline{M}_C$ are supplied from the inverter circuits 36, 38 and 40. These control signals $-\overline{M}_A$, $-\overline{M}_B$ and $-\overline{M}_C$ correspond to 30°-portions $-\overline{A}$, $-\overline{B}$ and $-\overline{C}$ of voltage waveforms $V_U$, $V_V$ and $V_W$ which are shown in FIG. 6.

At the same time that control signals are read from the memory circuit 42, the channel decoder 68 receives clock signals S6 and supplies logic "1" signals one after another to the waveform synthesizing circuit 78, the first signal via the output terminal CH0, the second signal via the output terminal CH1, the third signal via the output terminal CH2, and so forth. In response to a logic "1" signal from the output terminal CH0, the waveform synthesizer 70 supplies via its output terminals U0, V0 and W0 three control signals $M_A$, $M_B$ and $M_C$ which correspond to 30°-portions A, B and C shown in FIG. 6. In response to a logic "1" signal from the output terminal CH1, the waveform synthesizer 70 supplies via its output terminals U0, V0 and W0 three control signals $-\overline{M}_A$, $-\overline{M}_B$ and $-\overline{M}_C$ which correspond to 30°-portions $-A$, $-B$ and $-C$ shown in FIG. 6. Similarly, in response to a logic "1" signal from the output terminal CH2, the waveform synthesizer 70 supplies via its output terminal U0, V0 and W0 three control signals $\overline{M}_A$, $\overline{M}_B$ and $\overline{M}_C$ which correspond to 30°-portions A, B and C shown in FIG. 6. Further, in response to a logic "1" signal from the output terminal CH3, the synthesizer 70 supplies via its output terminals U0, V0 and W0 three control signals $-M_A$, $-M_B$ and $-M_C$ which correspond to 30°-portions $-A$, $-B$ and $-C$ shown in FIG. 6. Likewise, in response to a logic "1" signal from the output terminal CH4, the synthesizer 70 supplies via its output terminals U0, V0 and W0 three control signals $\overline{M}_A$, $\overline{M}_B$ and $\overline{M}_C$ which correspond to 30°-portions A, B and C shown in FIG. 6. Further, in response to a logic "1" signal from the output terminal CH5, the synthesizer 70 supplies through its output terminals U0, V0 and W0 three control signals $-\overline{M}_A$, $-\overline{M}_B$ and $-\overline{M}_C$ which correspond to 30°-portions $-A$, $-B$ and $-C$ shown in FIG. 6.

Thus, from the output terminal U0 of the waveform synthesizer 70 there are sequentially supplied control signals $M_A$, $-M_B$, $\overline{M}_C$, $-\overline{M}_C$, $M_B$, $-M_A$, $\overline{M}_A$, $-\overline{M}_B$, $M_C$, $-M_C$, $\overline{M}_B$ and $-\overline{M}_A$. From the output terminal V0 there are sequentially supplied control signals $M_C$, $-M_C$, $\overline{M}_B$, $-\overline{M}_A$, $M_A$, $-M_B$, $\overline{M}_C$, $-\overline{M}_C$, $M_B$, $-M_A$, $\overline{M}_A$ and $-\overline{M}_B$. From the output terminal W0 of the waveform synthesizer 70 there are sequentially supplied control signals $M_B$, $-M_A$, $\overline{M}_A$, $-\overline{M}_B$, $M_C$, $-M_C$, $\overline{M}_B$, $-\overline{M}_A$, $M_A$, $-M_B$, $\overline{M}_C$ and $-\overline{M}_C$. These control signals are supplied to the inverter main circuit 10 one after another as the phases of the output voltage waveforms $V_U$, $V_V$ and $V_W$ advance by electrical angle of 30° at a time.

More specifically, these control signals are supplied directly to the bases B1, B2 and B3 of the transistors Tr1, Tr2 and Tr3 and also to the bases B4, B5 and B6 of the transistors Tr4, Tr5 and Tr6 through the inverter circuits 72, 74 and 76. In consequence, such three phase sinusoidal output waveforms $V_U$, $V_V$ and $V_W$ as illustrated in FIG. 6 are obtained.

This invention is not limited to the above-described embodiment. For example, the control signals $M_A$, $M_B$ and $M_C$ and so on may correspond to portions of output waveforms $V_U$, $V_V$ and $V_W$, which have an electrical angle of more or less than 30°. It is sufficient to use control signals which correspond to 180°/n portions of the output waveforms, where n is a positive integer.

Further, the control apparatus of this invention may be applied to a monophase inverter as well as a three phase inverter.

Needless to say, a various modifications are possible within the scope of the invention herein described.

What we claim is:

1. An apparatus for controlling an inverter main circuit, comprising:
   an output setting circuit for generating digital signals determining the output frequency of an inverter main circuit;
   a memory circuit connected to the output setting circuit for storing control signals having logic patterns which correspond to the frequencies represented by the digital signals, said control signals each corresponding to a 180°/n portion of the output voltage waveform of the inverter main circuit, where n is a positive integer;
   a correcting circuit connected to the output setting circuit for generating, according to the digital signals, a first clock signal which makes the output voltage of the inverter main circuit have a predetermined relation with the frequency represented by the digital signals;
   an up-down counter connected to the correcting circuit for counting up and down the first clock signals and reading the control signals from the memory circuit in ascending and descending sequences of address numbers of the memory circuit, thereby generating a second clock signal every time the counting direction is reversed;

a converter connected to the up-down counter for generating a signal in response to the second clock signal, said converter having 2n output terminals from which one signal after another is supplied; and a waveform synthesizer circuit connected to the memory circuit and the converter for supplying to the inverter main circuit some of the control signals read from the memory circuit in a predetermined order, every time the inverter main circuit generates a $180°/n$ portion of the output voltage waveform and in accordance with the signals supplied one after another from the output terminals of the converter.

2. An apparatus according to claim 1, wherein said memory circuit comprises a ROM connected to said output setting circuit and said up-down counter, said ROM having a plurality of memory areas which are designated by digital signals supplied from said output setting circuit and the addresses of which are designated by signals supplied from said up-down counter; a data selector connected to the ROM and said output setting circuit for selecting, according to a signal supplied from said output setting circuit, some of the bits stored in an address designated by signals supplied from said up-down counter and read these bits from said memory circuit; and inverter circuits connected to the data selector for inverting the outputs of the data selector.

3. An apparatus according to claim 1, wherein said up-down counter comprises an up-down counter section connected to said correcting circuit for counting first clock signals and supplying address designating signals to said memory circuit; a detector section connected to the up-down counter section for detecting the change of counting mode; a flip-flop connected to the detector section and set and reset according to an output signal of the detector section, thereby supplying a count-up signal and a count-down signal to the up-down counter; and a circuit connected to the detector section for supplying second signals to said converter.

4. An apparatus according to claim 1, wherein said waveform synthesizer circuit comprises a waveform synthesizer connected to said memory circuit and said converter for supplying in a predetermined order the control signals read from said memory circuit and inverter circuits connected to the waveform synthesizer for inverting the output signals of the waveform synthesizer.

* * * * *